Figure 1:
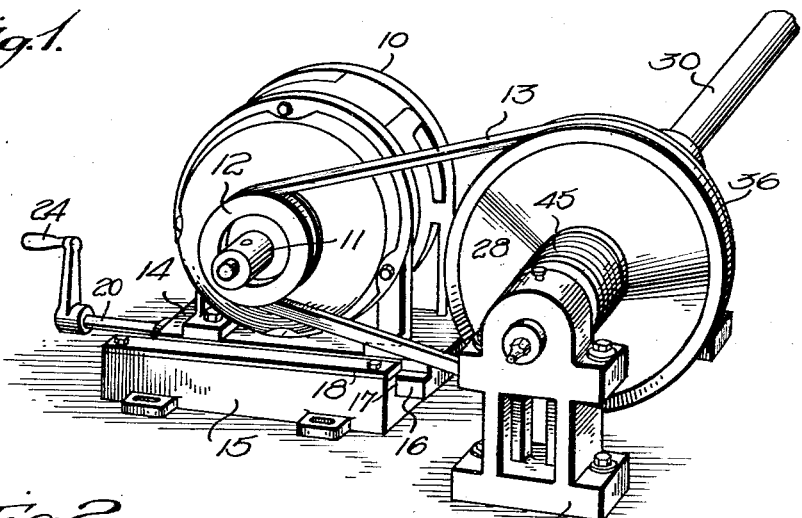

Feb. 8, 1938. A. B. KNIGHT 2,107,483
VARIABLE SPEED TRANSMISSION
Filed June 12, 1936 2 Sheets-Sheet 1

Inventor
A.B. KNIGHT
Attorney

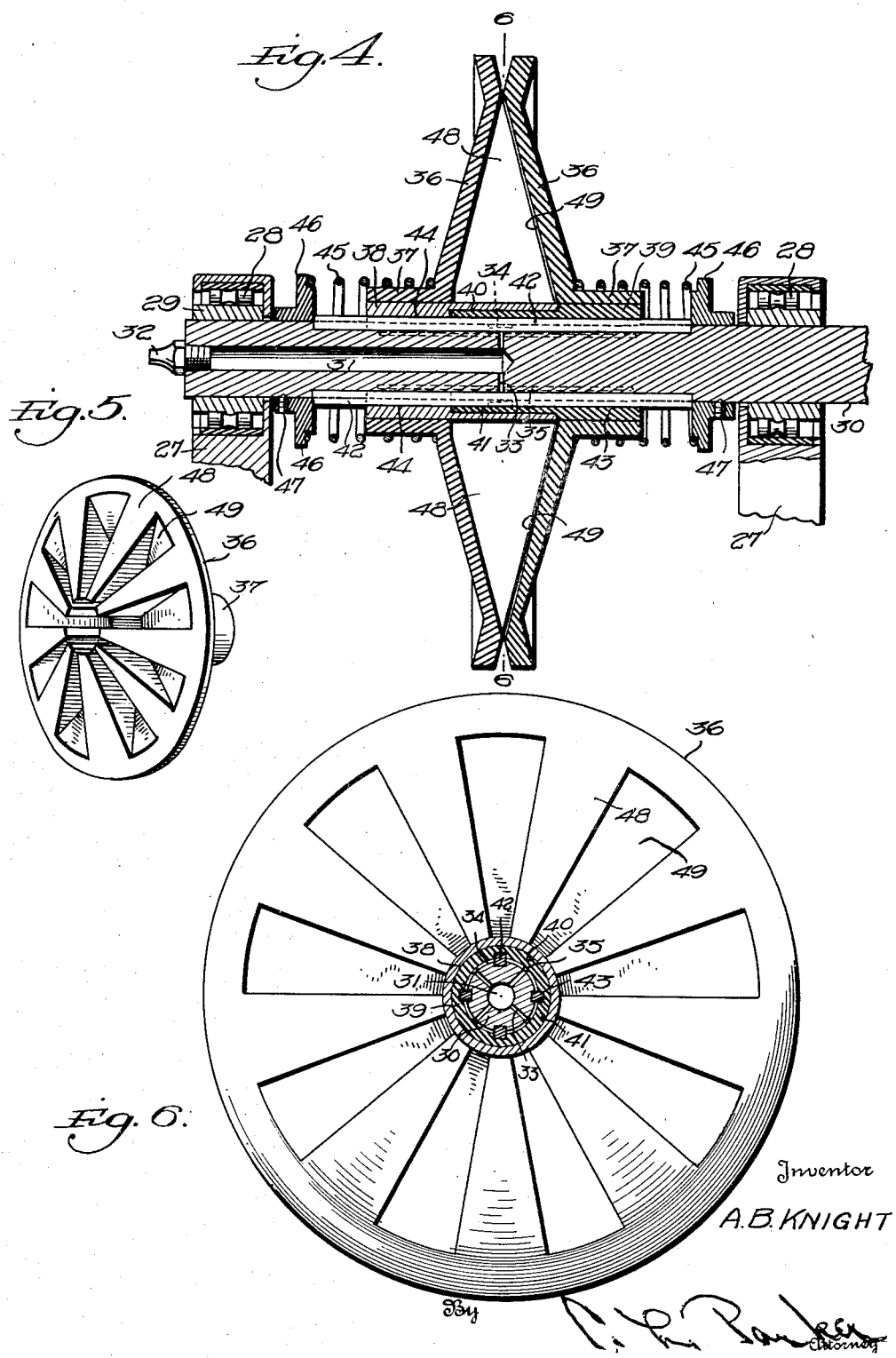

Patented Feb. 8, 1938

2,107,483

UNITED STATES PATENT OFFICE 2,107,483

VARIABLE SPEED TRANSMISSION

Albert Breakenridge Knight, Fairmont, W. Va.

Application June 12, 1936, Serial No. 84,941

9 Claims. (Cl. 74—230.17)

This invention relates to variable speed transmissions.

Various types of variable speed transmissions are in common use, and one such transmission involves the use of a variable speed unit comprising a pair of axially movable coacting pulley members having conical adjacent faces between which a belt is engageable. The transmission members are movable toward and away from each other to vary the radius of the circle around which the belt travels, as is well known. Transmissions of this character have been in successful operation for many years, but they involve substantial disadvantages. For example, in the type most commonly employed, the adjacent faces of the transmission members or disks are continuous cones, and accordingly they are movable toward each other only to the extent permitted by the portions of the cones adjacent the axis thereof.

As a result, the peripheral portions of the cones are always spaced a substantial distance apart, thus requiring the use of a wide V-belt as the power transmitting medium. Such belt must be relatively thin so as to minimize the differences in peripheral speeds at the radially inner and outer limits of the belt, and due to the necessary width of the belt, it obviously is necessary that the belt be substantially reinforced with the result that the belt possesses insufficient flexibility; it absorbs substantial power resulting in considerable power losses; and it is relatively expensive to manufacture.

To overcome the difficulties referred to, it has been proposed that the cones be provided with coacting radial fingers and recesses inter-engageable to permit the peripheral portions of the cones to be moved in close proximity. Such a transmission is successful in materially reducing the width of the belt, thus permitting a cheaper and more flexible belt structure of substantially longer life. However, such a transmission is open to a serious objection in that transverse loads are not properly supported throughout the length of the cone members axially thereof, and accordingly the cone members are subjected to rapid wear in the hub portions thereof, resulting in their becoming loose on their shafts. Accordingly where such a transmission overcomes substantial difficulties in prior similar devices, it introduces an additional serious difficulty.

Generally speaking, an important object of the present invention is to provide a variable speed transmission of the type referred to wherein the disadvantages of both of the earlier types of transmission are eliminated.

A further object is to provide a variable speed transmission including a pair of coacting belt-engaging transmission cones which are movable into close proximity but which are efficiently supported on the shaft throughout the length of the combined cone structures.

A further object is to provide a transmission of the character referred to wherein each cone has its hub portion surrounding a sleeve secured thereto, the two sleeves being telescoped with respect to each other to permit the desired variation in the relative positions of the cones while efficiently supporting them on the shaft.

A further object is to provide a transmission of this character wherein the sleeve of each cone extends from the outer limit thereof to a point adjacent the other limit of the cone and telescoping with respect to the other sleeve whereby all portions of the cones are always efficiently supported on the shaft to take up transverse loads without causing the cones to become loose on the shaft.

Other objects and advantages of the invention will become apparent during the course of the following description.

Figure 2:
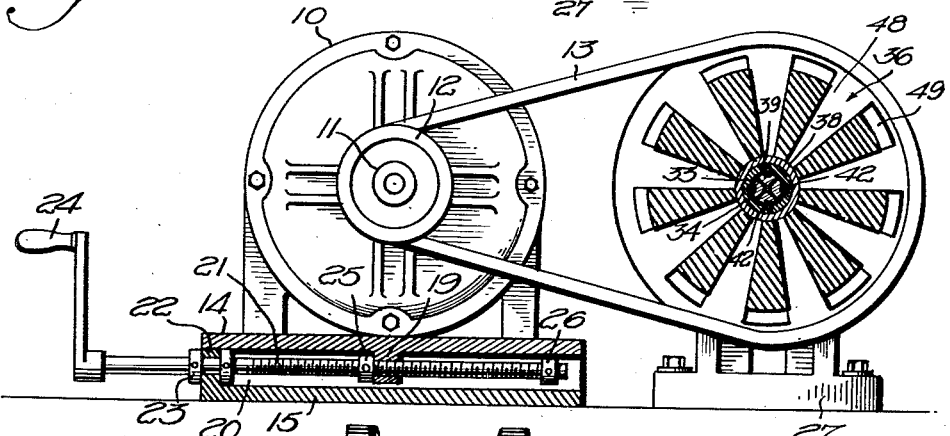
Figure 3:
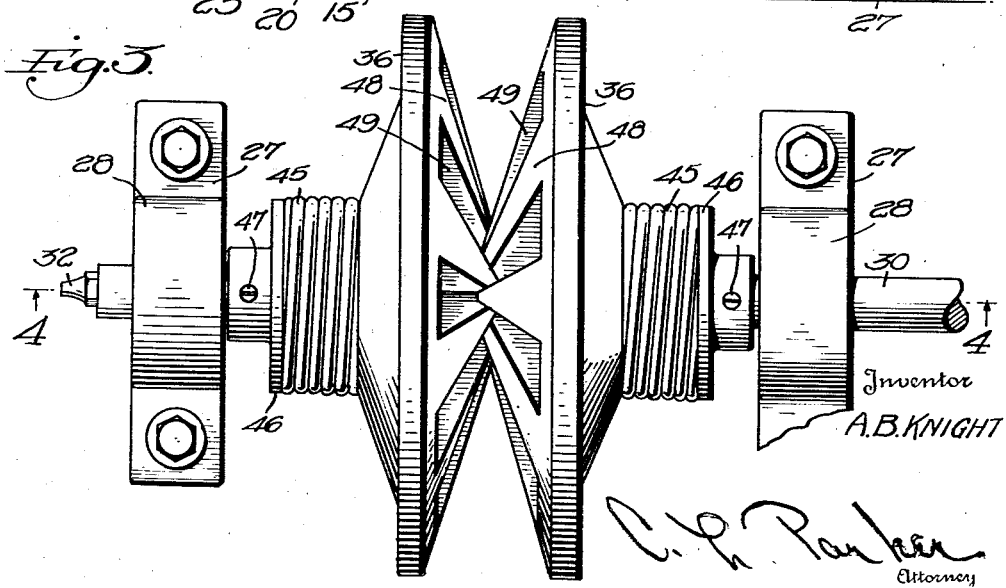

In the drawings I have shown one embodiment of the invention. In this showing,

Figure 1 is a perspective view of a typical installation including a motor and transmission unit, Figure 2 is a vertical sectional view of the same taken substantially in the plane of the driving belt, the motor pulley being shown in elevation, Figure 3 is an enlarged plan view of the variable speed unit, Figure 4 is an enlarged axial sectional view of the same taken on line 4—4 of Figure 3, Figure 5 is a detail perspective view of one of the cones, and Figure 6 is a section on line 6—6 of Figure 4.

Referring to Figures 1 and 2, the numeral 10 designates a motor illustrated as the source of power in the present embodiment of the invention. This motor is provided with the usual shaft 11 which carries a V-type pulley 12 around which passes a V-belt 13. The motor is directly secured to a base 14 which is slidable with respect to a support 15. It will be noted that the base 14 carries flanges 16 at its opposite edges slidable in guideways 17 formed in the support 15, a plate 18 being secured to the top of the support at each side thereof to form the top of the guideways 17.

The base 14 is provided with a depending lug 19 substantially centrally thereof and the support 15 is provided thereacross with a slot 20 into which the lug 19 projects. A shaft 21 is threaded in the lug 19 as shown in Figure 2. The threads of the shaft 21 terminate approximately at the point indicated in Figure 2, and the outwardly extending end of the shaft is cylindrical as will be apparent. The cylindrical portion of the shaft is rotatable in a lug 22 carried by the support 15 and collars 23, secured to the shaft 21, engage opposite sides of the lug 22 to prevent the shaft 21 from moving axially with respect thereto.

The outer end of the shaft 21 is provided with an operating handle 24, and it will be apparent that rotation of this handle feeds the lug 19 along the shaft 21, thus adjusting the position of the motor 10. The shaft 21 is provided with spaced stops 25 and 26 engageable with the lug 19 to limit the movement of the motor for a purpose to be described.

The variable speed unit comprises a pair of bearing supports 27 in the upper ends of which are arranged roller or other anti-friction bearings 28, the inner races 29 of such bearings carrying a shaft 30. In the present instance this shaft is the power take-off shaft, but it will be apparent that the present invention is not limited to the use of the variable speed transmission with respect to any specific parts of a power transmitting system. The shaft is preferably provided in one end with an axial lubricant passage 31 to which lubricant is supplied through a suitable pressure fitting 32. At the inner end of the passage 31, the shaft is radially drilled as at 33 to feed lubricant to an annular groove 34 from which it is distributed longitudinally through small grooves 35.

A pair of coacting transmission members 36 is mounted for movement on the shaft 30, these members being preferably identical in construction as will become apparent. Each cone includes a hub portion 37 and a sleeve 38 has one end arranged in one of the hubs 37. The other hub 37 is provided with a coacting sleeve 39. The two sleeves are a driving fit in their respective hubs 37 and terminate at the remote extremities thereof. The sleeves extend inwardly toward each other and the sleeve 38 is provided in the inner end thereof with an axial recess 40 receiving the reduced inner end 41 of the sleeve 39. The sleeve 39 is in sliding engagement throughout its length with the shaft 30, while the sleeve 38 is in similar sliding engagement with the shaft 30 between the inner end of the recess 40 and the left hand end of the sleeve as viewed in Figure 4. While the opposite end of the sleeve 38 is not directly supported by the shaft 30, it will be apparent that it has a snug sliding fit with the reduced end 41 of the sleeve 39, which latter sleeve is, in turn, directly supported by the shaft 30 throughout its length.

Keys are provided for forming a splined connection between the sleeves 38 and the shaft 30 to permit axial movement of the transmission members 36 toward and away from each other. As shown in Figures 4 and 6, keys 42 are carried by the shaft 30 and slidably engage keyways 43 formed within the sleeve 39 and extending throughout the length thereof. Similar keyways 44 are formed in the portion of the sleeve 38 which directly surrounds the shaft 30. Accordingly it will be apparent that the transmission members 36 are axially movable toward and away from each other.

The relative positions of the transmission members 36 may be controlled by any suitable mechanical means, and in the present instance, such means comprises a spring 45 of the compression type having its inner end surrounding each of the hubs 37, as clearly shown in Figure 4. The outer end of each spring engages against a spring seat 46 secured by set screws 47 or the like to the shaft 30 to rotate therewith.

Each transmission member 36 is generally conical on opposite faces thereof. The back faces of the transmission members are preferably solidly conical and integral with the respective hubs 37. The inner faces of the transmission members, while generally conical in shape, are provided with spaced radially extending fingers 48 separated by similarly shaped radial recesses 49 which extend inwardly to the solid conical back portions of the members 36 as shown in Figure 4. The fingers 48 are shaped similar to the recesses 49, as previously stated, and they extend substantially to the depths of such recesses when the transmission members 36 are arranged at their closest points, as shown in Figure 4. The outer faces of the fingers 48 and the portions of the inner faces of the two transmission members radially outwardly of the fingers 48 define perfect cones between which the belt 13 passes. It will be apparent that the fingers of one transmission member extend into the recesses 49 of the other transmission member, and such recesses are substantially identical in shape with the fingers 48 to permit the two transmission members 36 to move axially without permitting any relative rotation therebetween.

The operation of the apparatus is as follows:

In the present instance one variable speed unit has been shown, and such unit is adapted to be driven from the pulley 12 by means of the belt 13 to impart rotary motion to the shaft 30. Such showing obviously constitutes only one embodiment of the invention as will be obvious from various uses of variable speed transmissions of the present general type in the prior art. For example, the pulley 12 may be mounted on the shaft 30 with the variable speed units mounted on the shaft 11, and various other combinations of parts may be employed.

When the parts of the apparatus are in the positions shown in Figures 1 and 2, the belt 13 engages the adjacent faces of the transmission members 36 at a maximum radius, and accordingly the shaft 30 will be driven at a minimum speed. The stop member 25 is arranged in engagement with the lug 19 to limit the movement of the motor 10 toward the transmission unit, thus preventing the latter from being permitted to run off the transmission unit.

Relatively increased speeds of the shaft 30 may be accomplished by rotating the handle 24 to move the motor 10 relatively away from the transmission unit. This operation causes the belt 13 to be moved progressively inwardly with respect to the shaft 30 to reduce the radius of operation of the belt, such operation being carried out against the tension of the springs 45 which hold the inner faces of the transmission members 36 in snug engagement with opposite sides of the belt 13. The motor 10 may be moved away from the transmission unit until the belt either contacts with the outer face of the sleeve 39, at which point the movement of the motor will be limited, or the stop member 26 may be provided on the shaft 21 to accomplish the same result.

It will be apparent that the sleeves 38 and 39 are splined on the shaft 30 and each transmission member 36 therefore coacts with the other member to positively drive the shaft 30. Each of the sleeves 38 and 39 extends throughout the length of its associated transmission member as shown in Figure 4. Since the sleeve 39 contacts throughout its length with the shaft 30, the corresponding transmission member 36 is directly supported by the shaft 30 through the medium of the sleeve 39. The sleeve 38 directly supports the outer end of its associated transmission member 36 with respect to the shaft 30, while the inner end of the sleeve 38 snugly surrounds the end 41 of the sleeve 39 to thus provide adequate support for the other end of the member 36 which is carried by the sleeve 38. Without the sleeves 38 and 39 it will be apparent that each member 36 will be supported only throughout the length of its hub portion, the transverse strain transmitted by the belt 13 being taken up by the transmission members under such conditions at points extending longitudinally beyond the hub members. Under such conditions excessive wear would be caused, and in practice it has been found that the conical transmission members would soon become loose on their supporting shaft. With the present construction, adequate and efficient supporting means is provided for both members 36, and the supporting of these members with respect to the shaft 30 extends on both sides of the plane of the transverse line of pull of the belt. In practice, therefore the transmission has been found to operate without the development of any looseness between the members 36 and their supporting shaft.

The use of the inter-engaging fingers of the conical members 36 permits the use of a relatively narrow belt, and any commercially available V-shaped belt may be employed as the driving means. A belt of this type is far more flexible than the wide belts which necessarily must be used with transmissions of this type having solid inner conical faces, and thus power losses are reduced to a minimum. Moreover, such belts are much cheaper than belts of the other type referred to and they operate efficiently over long periods of time. Accordingly it will be apparent that the present construction embodies all of the desirable characteristics of the two earlier transmissions of the present general type previously discussed, and at the same time it eliminates the faults and disadvantages of such earlier types.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. A transmission unit comprising a shaft, a pair of coacting transmission members relatively longitudinally slidable on said shaft and provided with conical adjacent faces adapted to receive a belt therebetween, said transmission members being provided with slots forming fingers therebetween inter-engageable to render said transmission members movable to relative positions with their peripheral portions in close proximity, and a coaxial supporting sleeve member carried by each transmission member for supporting it with respect to said shaft, each sleeve member extending approximately to the inner end of its associated transmission member.

2. A transmission unit comprising a shaft, a pair of coacting transmission members relatively longitudinally slidable on said shaft and provided with conical adjacent faces adapted to receive a belt therebetween, said transmission members being provided with slots forming fingers therebetween inter-engageable to render said transmission members movable to relative positions with their peripheral portions in close proximity, a coaxial sleeve member carried by each transmission member for supporting it with respect to said shaft, and spline connections between at least one sleeve member and said shaft, each sleeve extending approximately to the inner longitudinal limit of its associated transmission member.

3. A transmission unit comprising a shaft, a pair of coacting transmission members relatively longitudinally slidable on said shaft and provided with conical adjacent faces adapted to receive a belt therebetween, said transmission members being provided with slots forming fingers therebetween inter-engageable to render said transmission members movable to relative positions with their peripheral portions in close proximity, and a sleeve member carried by each transmission member for supporting it with respect to said shaft, one of said sleeve members being engageable throughout its length with said shaft, the other sleeve member having one end portion engaging said shaft and its other end portion fitting and telescopically receiving the adjacent end of the first named sleeve member.

4. A transmission unit comprising a shaft, a pair of coacting transmission members relatively longitudinally slidable on said shaft and provided with conical adjacent faces adapted to receive a belt therebetween, said transmission members being provided with slots forming fingers therebetween inter-engageable to render said transmission members movable to relative positions with their peripheral portions in close proximity, each transmission member being provided with a hub portion projecting axially away from the other transmission member, and a sleeve member mounted in and fixed with respect to each hub and projecting axially toward the other transmission member, each sleeve member extending substantially to the inner longitudinal limit of its associated transmission member.

5. A transmission unit comprising a shaft, a pair of coacting transmission members relatively longitudinally slidable on said shaft and provided with conical adjacent faces adapted to receive a belt therebetween, said transmission members being provided with slots forming fingers therebetween inter-engageable to render said transmission members movable to relative positions with their peripheral portions in close proximity, each transmission member being provided with a hub portion projecting axially away from the other transmission member, a sleeve member mounted in and fixed with respect to each hub and projecting axially toward the other transmission member, each sleeve member extending substantially to the inner longitudinal limit of its associated transmission member, and spline means connecting at least one of said sleeve members to said shaft for rotation therewith.

6. A transmission unit comprising a shaft, a pair of coacting transmission members relatively longitudinally slidable on said shaft and provided with conical adjacent faces adapted to receive a belt therebetween, said transmission members being provided with slots forming fingers therebetween inter-engageable to render said transmission members movable to relative positions with their peripheral portions in close proximity, each transmission member being provided with a hub portion projecting axially away from the other transmission member, and a sleeve member mounted in and fixed with respect to each hub and projecting axially toward the other transmission member, one of said sleeve members being in contact substantially throughout its length with said shaft, the other sleeve member having one end portion surrounding said shaft in contact therewith and its other end portion fitting and telescopically receiving the adjacent end portion of the first named sleeve member.

7. A transmission unit comprising a shaft, a pair of coacting transmission members relatively longitudinally slidable on said shaft and provided with conical adjacent faces forming an annular V-shaped belt receiving groove, said transmission members being provided with radial slots forming fingers therebetween inter-engageable to render said transmission members movable to relative positions with their peripheral portions in close proximity, a sleeve member carried by each transmission member coaxially therewith for supporting it with respect to said shaft, each sleeve member being approximately longitudinally coextensive with its associated transmission member, spring means urging said transmission members relatively toward each other, a pulley rotatable on an axis parallel to the axis of said shaft, a belt passing around said pulley and around said belt receiving groove, and means for moving said pulley and said shaft relatively toward and away from each other.

8. A transmission unit comprising a shaft, a pair of coacting transmission members relatively longitudinally slidable on said shaft and provided with conical adjacent faces forming an annular V-shaped belt receiving groove, said transmission members being provided with radial slots forming fingers therebetween inter-engageable to render said transmission members movable to relative positions with their peripheral portions in close proximity, a sleeve member carried by each transmission member coaxially therewith for supporting it with respect to said shaft, one sleeve member engaging throughout its length with said shaft, the other sleeve member having one end portion engaging said shaft and its other end portion fitting and telescopically receiving said first named sleeve member, spring means urging said transmission members relatively toward each other, a pulley rotatable on an axis parallel to the axis of said shaft, a belt passing around said pulley and around said belt receiving groove, and means for moving said pulley and said shaft relatively toward and away from each other.

9. A transmission unit comprising a shaft, a pair of coacting transmission members relatively longitudinally slidable on said shaft and provided with conical adjacent faces forming an annular V-shaped belt receiving groove, said transmission members being provided with radial slots forming fingers therebetween inter-engageable to render said transmission members movable to relative positions with their peripheral portions in close proximity, each transmission member having a hub portion extending longitudinally away from the other transmission member, and a sleeve member mounted in and fixed to each hub portion and extending substantially throughout the length of its associated transmission member to support the latter with respect to said shaft, spring means urging said transmission members relatively toward each other, a pulley rotatable on an axis parallel to the axis of said shaft, a belt passing around said pulley and around said belt receiving groove, and means for moving said pulley and said shaft relatively toward and away from each other.

ALBERT BREAKENRIDGE KNIGHT.